United States Patent
Bernett

(10) Patent No.: US 11,086,586 B1
(45) Date of Patent: Aug. 10, 2021

(54) APPARATUSES AND METHODOLOGIES RELATING TO THE GENERATION AND SELECTIVE SYNCHRONIZED DISPLAY OF MUSICAL AND GRAPHIC INFORMATION ON ONE OR MORE DEVICES CAPABLE OF DISPLAYING MUSICAL AND GRAPHIC INFORMATION

(71) Applicant: Jeffrey R. Bernett, Richfield, MN (US)

(72) Inventor: Jeffrey R. Bernett, Richfield, MN (US)

(73) Assignee: Auryn, LLC, Richfield, MN (US)

( * ) Notice: Subject to any disclaimer, the term of this patent is extended or adjusted under 35 U.S.C. 154(b) by 0 days.

(21) Appl. No.: 17/021,570

(22) Filed: Sep. 15, 2020

Related U.S. Application Data

(60) Provisional application No. 62/989,028, filed on Mar. 13, 2020.

(51) Int. Cl.
*G06F 3/048* (2013.01)
*G06F 3/147* (2006.01)
*G06F 3/0482* (2013.01)
*G06F 3/0485* (2013.01)
*G06F 3/0484* (2013.01)
*G10H 1/00* (2006.01)
*G06F 3/0481* (2013.01)

(52) U.S. Cl.
CPC ............ *G06F 3/147* (2013.01); *G06F 3/0482* (2013.01); *G06F 3/0485* (2013.01); *G06F 3/04847* (2013.01); *G10H 1/0008* (2013.01); *G06F 3/04817* (2013.01); *G06F 3/04845* (2013.01); *G06F 2203/04803* (2013.01); *G10H 2220/101* (2013.01)

(58) Field of Classification Search
None
See application file for complete search history.

(56) References Cited

U.S. PATENT DOCUMENTS

| | | | | |
|---|---|---|---|---|
| 7,239,320 B1 * | 7/2007 | Hall | ...................... | G10H 1/368 345/473 |
| 8,779,265 B1 * | 7/2014 | Gottlieb | ............... | G10H 1/0033 84/600 |
| 8,907,195 B1 * | 12/2014 | Erol | ........................ | G10H 1/361 84/609 |
| 2001/0023633 A1 * | 9/2001 | Matsumoto | .......... | G10H 1/0008 84/478 |
| 2005/0241462 A1 * | 11/2005 | Hirano | ................. | G10H 1/0008 84/600 |

(Continued)

FOREIGN PATENT DOCUMENTS

WO 2014164764 A1 10/2014

*Primary Examiner* — Hua Lu
(74) *Attorney, Agent, or Firm* — Andy Schofield

(57) ABSTRACT

A method for the generation and selective display of musical information on one or more devices capable of displaying musical information can include generating a plurality of visual blocks, each block among the plurality having a first dimension and a second dimension corresponding to musical information visible with each block. The method can include selectively displaying, via a first GUI and/or a second GUI, particular blocks among the plurality of visual blocks. The musical information to contained in a quantity of the respective subsets of the particular blocks displayed on the second GUI can be include at least a portion of respective subsets of the particular blocks displayed on the first GUI.

20 Claims, 6 Drawing Sheets

(56) References Cited

U.S. PATENT DOCUMENTS

| | | | | |
|---|---|---|---|---|
| 2007/0012164 | A1* | 1/2007 | Morley | G10H 1/0008 84/609 |
| 2008/0190271 | A1* | 8/2008 | Taub | G10H 1/0058 84/645 |
| 2009/0019995 | A1* | 1/2009 | Miyajima | G11B 27/034 84/625 |
| 2009/0165634 | A1* | 7/2009 | Mahowald | G10H 1/368 84/610 |
| 2010/0257994 | A1* | 10/2010 | Hufford | G10H 1/0025 84/609 |
| 2011/0132176 | A1* | 6/2011 | Maebius | G10H 1/0008 84/612 |
| 2011/0276333 | A1* | 11/2011 | Wang | G06F 16/95 704/270 |
| 2012/0014673 | A1* | 1/2012 | O'Dwyer | G10H 1/40 386/282 |
| 2012/0269344 | A1* | 10/2012 | VanBuskirk | H04K 1/00 380/255 |
| 2013/0238999 | A1* | 9/2013 | Helms | G10H 1/0066 715/727 |
| 2013/0330062 | A1* | 12/2013 | Meikle | G11B 27/28 386/285 |
| 2014/0033903 | A1* | 2/2014 | Araki | G10H 1/0008 84/612 |
| 2014/0280589 | A1* | 9/2014 | Atkinson | H04L 65/605 709/204 |
| 2014/0282004 | A1* | 9/2014 | Birmingham | G11B 27/031 715/727 |
| 2015/0095822 | A1* | 4/2015 | Feis | G06F 3/04842 715/765 |
| 2016/0336039 | A1* | 11/2016 | Leiberman | G11B 27/34 |
| 2017/0142458 | A1* | 5/2017 | Watanabe | H04N 21/4788 |
| 2018/0068643 | A1* | 3/2018 | Ishioka | G10H 1/42 |
| 2018/0295427 | A1* | 10/2018 | Leiberman | H04N 21/8166 |
| 2019/0244639 | A1* | 8/2019 | Benedetto | G11B 27/036 |

* cited by examiner

APPARATUSES AND METHODOLOGIES RELATING TO THE GENERATION AND SELECTIVE SYNCHRONIZED DISPLAY OF MUSICAL AND GRAPHIC INFORMATION ON ONE OR MORE DEVICES CAPABLE OF DISPLAYING MUSICAL AND GRAPHIC INFORMATION

PRIORITY INFORMATION

This application claims priority to U.S. Provisional Application Ser. No. 62/989,028, filed on Mar. 13, 2020, the contents of which are incorporated herein by reference.

TECHNICAL FIELD

The present disclosure relates generally to the display of musical information via a graphical user interface and methods, and more particularly, to apparatuses, systems, and methods relating to the generation and selective synchronized display of musical and graphic information on one or more devices capable of displaying musical and graphic information.

BACKGROUND

A graphical user interface (GUI) can display images on a display device. The images displayed via the GUI can correspond to instructions executed by a computing system. A user, for example, a musician, can manipulate the images displayed via a GUI to facilitate creation and reproduction of musical information.

DETAILED DESCRIPTION

Figure 1:
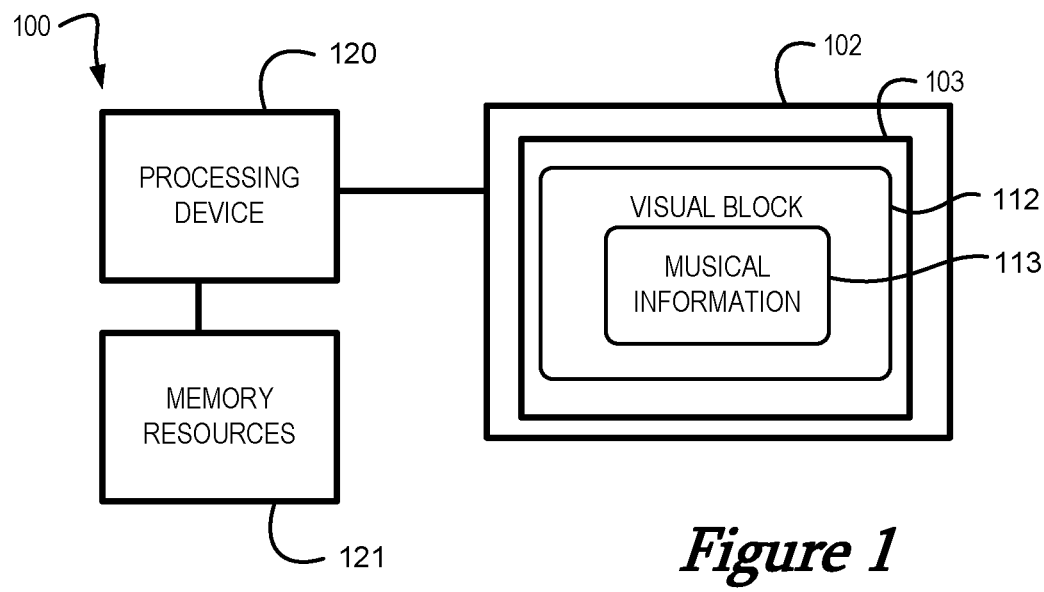
FIG. 1 is a diagram illustrating an apparatus including a display device and graphical user interface to display musical and graphic information in accordance with a number of embodiments of the present disclosure.

Apparatuses, systems, and methods relating to the generation and selective display of synchronized musical information on one or more devices capable of displaying musical information are described herein. A method for the generation and selective display of musical information on one or more devices capable of displaying musical information can include generating a plurality of visual blocks, each block among the plurality having a first dimension and a second dimension corresponding to musical information visible with each block. The method can include selectively displaying, via a first GUI and/or a second GUI, particular blocks among the plurality of visual blocks. The musical information contained in a quantity of the respective subsets of the particular blocks displayed on the second GUI can include at least a portion of respective subsets of the particular blocks displayed on the first GUI. Although described herein in terms of "subsets" of the particular blocks for simplicity, in some embodiments, the musical information contained in the particular blocks displayed on the first GUI or the second GUI can be qualitatively different than the musical information displayed on the other of the first GUI or the second GUI.

For example, a method relating to the generation and selective display of musical information on one or more devices capable of displaying musical information can include generating a plurality of visual blocks, each block among the plurality having a first dimension corresponding to a tempo (e.g. a beats-per-minute parameter), a time signature, or combinations thereof, and a second dimension corresponding to musical information visible with each block and selectively displaying, via a first GUI, particular blocks among the plurality of visual blocks. The method can further include displaying, via the first GUI and in response to a first command, information corresponding to musical information in selectable subsets of the particular blocks and generating, in response to a second command, selectable respective subsets of the particular blocks containing the musical information to be displayed on the first GUI and a second GUI, wherein information contained in a quantity of the respective subsets of the particular blocks displayed on the second GUI comprise at least a portion of respective subsets of the particular blocks displayed on the first GUI. In some embodiments, the method relating to the generation and selective display of musical information on one or more devices capable of displaying musical information can include displaying, on the first GUI, the respective subsets of the particular blocks to be displayed on the first GUI and/or displaying, on the second GUI, the respective subsets of the particular blocks to be displayed on the second GUI.

Musicians can produce and play music in a wide variety of settings and scenarios. Such settings and scenarios can include rotating and/or changing members within a band or ensemble. However, playing music in disparate bands and/or with differing band members and/or ensembles can require a musician to learn a wide variety of musical arrangements and/or styles of music. For example, musicians that perform in cover bands (e.g., bands that perform music that was written by a third party) are often required to learn many songs or musical arrangements (e.g., a large set list) for live performances. The set list can change frequently based, for example, on the venue, the crowd demographics, and/or amount of time allotted for a band to perform. In addition, some cover bands regularly change their set list or set lists to keep audiences engaged at their performances and to suit the venue and/or expectations of management. Furthermore, due to many fluctuating variables on multiple fronts, the time frame for learning music and/or arrangement for musicians in preparation for a performance can often be very minimal. Also, with unexpected ensemble member absences which are bound to happen, the need for consistent, well documented musical information in a number of formats is especially pronounced.

Due to other engagements that musicians may have aside from performing in such bands, it can become necessary to substitute musicians in or out for live performances. However, learning a large set list can prove to be a complicated and time-consuming endeavor even for skilled musicians. Further, due to often stringent exactitude requirements for performing songs in a live setting (e.g., to provide an audience with accurate or semi-accurate reproductions of the songs the musicians are performing), there can be little room for error on the part of the musicians. This can further exacerbate difficulties associated with performing with different musicians and preparing set lists under time constraints. Another complicating factor that many modern performing musicians and ensembles must deal with is the inflexibility of static "backing audio tracks." These backing audio tracks basically perform the audio parts that cannot be feasibly performed in real time by a human in the ensemble. Since these audio parts are not changeable in real time, the need for exact execution of the arrangement is of great importance, lest the ensemble become out of sync with the backing audio tracks.

Some conventional computer software can allow for musicians to record and share musical compositions they have recorded with other musicians that may be in differing physical locations from the musician(s) that recorded portions of the musical compositions that can be shared. Some other conventional computer programs can allow for the display of musical information in different ways. However, such approaches do not allow for musicians to manipulate and selectively display synchronized musical information in real time across multiple devices and/or across devices operating on disparate platforms.

In contrast, embodiments herein are directed to apparatuses and methods that can allow for arrangement of synchronized musical information and the selective display thereof across multiple devices and/or platforms in real time. This can allow for musicians to view only the musical information that they need to see while performing, thereby mitigating the difficulties associated with performing with different musicians under strict time constraints among many other challenges generally presented when learning new music. This can, in turn, improve the overall performance of a musical ensemble, thereby increasing their chances of securing future opportunities to perform live music. In addition, embodiments described herein can allow for the amount of time a musical ensemble may spend to achieve mastery and/or cohesion in musical performances to be significantly reduced in comparison to some approaches, thereby allowing musicians to focus on other aspects of their performance, such as choreography, lighting, and/or other visual elements which may be neglected in other approaches.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N" and "M," "X," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of visual blocks) can refer to one or more visual blocks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures may be identified by the use of similar digits. For example, 102 may reference element "02" in FIG. 1, and a similar element may be referenced as 202 in FIG. 2A. A group or plurality of similar elements or components may generally be referred to herein with a single element number. For example, a plurality of reference elements 112-1, 112-2, . . . , 112-N (e.g., 112-1 to 112-N) may be referred to generally as 112. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a diagram illustrating an apparatus 100 including a display device 102 and graphical user interface (GUI) 103 to display musical and graphic information in accordance with a number of embodiments of the present disclosure. The apparatus 100 can be a computing device, such as a personal computer, a laptop, a tablet, a smartphone, a phablet, internet-of-things enabled device, or other computing device that includes a processing device 120 and memory resources 121 (e.g., volatile and/or non-volatile memory resources). In addition to, or in the alternative, the apparatus 100 can be coupled to a software defined data center and can therefore be configured to perform the embodiments described herein as a software as a service. As used herein, an "apparatus" can refer to, but is not limited to, any of a variety of structures or combinations of structures, such as a circuit or circuitry, a die or dice, a module or modules, a device or devices, or a system or systems, for example.

The display device 102 can be a television, computer monitor, instrument panel, or other device that displays information. Non-limiting examples of display devices include cathode ray tube (CRT) displays, liquid-crystal displays (LCDs), organic light-emitting diode (OLED) displays, active-matrix organic light-emitting diode (AMOLED) displays, etc. The display device 102 can be configured to display the GUI 103, as described in further detail, herein.

In some embodiments, the GUI 103 can be generated and/or displayed on the display device 102 through the execution of instructions processed by the processing device 120. For example, the processing device 120 can be configured to execute instructions that can cause the GUI 103 can be generated and/or displayed via the display device 102. The instructions can be executed in response to commands received by the processing device 120 in response to a user input. In this manner, a user can, for example, enter commands via a keyboard, touchpad, pointing device, voice detection device, microphone, MIDI controller, or other peripheral computing device and/or Internet-of-Things device to cause the instructions to be executed by the processing device 120 to cause the GUI 103 to be displayed via the display device 102. In addition, the commands can include commands that can cause the GUI 103 to be modified, altered, or otherwise selectively displayed as described in more detail, herein.

Figure 2A:
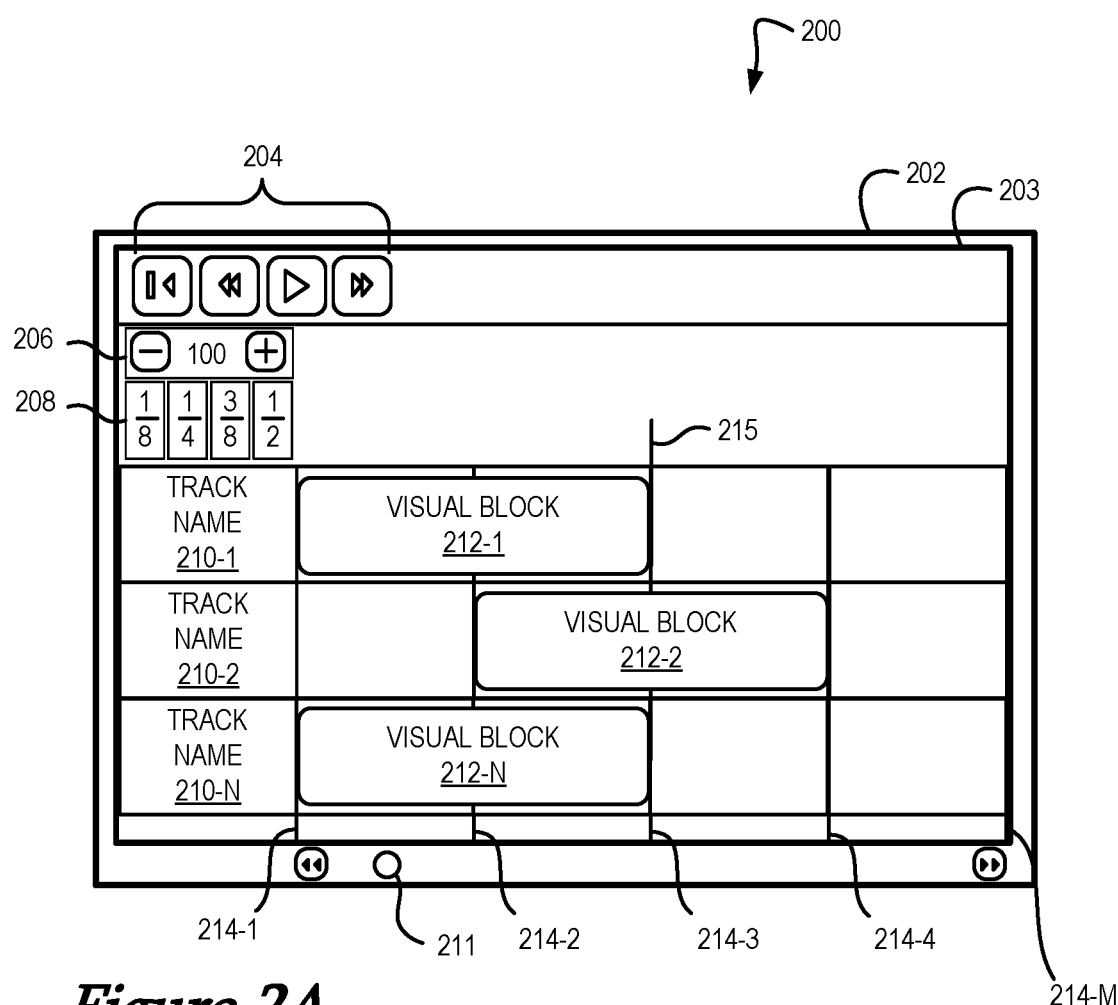
FIG. 2A is another diagram illustrating an apparatus including a display device and graphical user interface to display musical and graphic information in accordance with a number of embodiments of the present disclosure.

The GUI 103 can be configured to display a visual block 112 (or plurality of visual blocks, such as the plurality of visual blocks 212-1 to 212-N illustrated in FIG. 2A, herein). The visual block 112 can be formed from a quantity of pixels displayable on the display device 102. Accordingly, the visual block 112 can be movable, resizable, scalable or combinations thereof. For example, the visual block 112 can be "dragged" or resized in response to a command generated by a user input.

Figure 3:
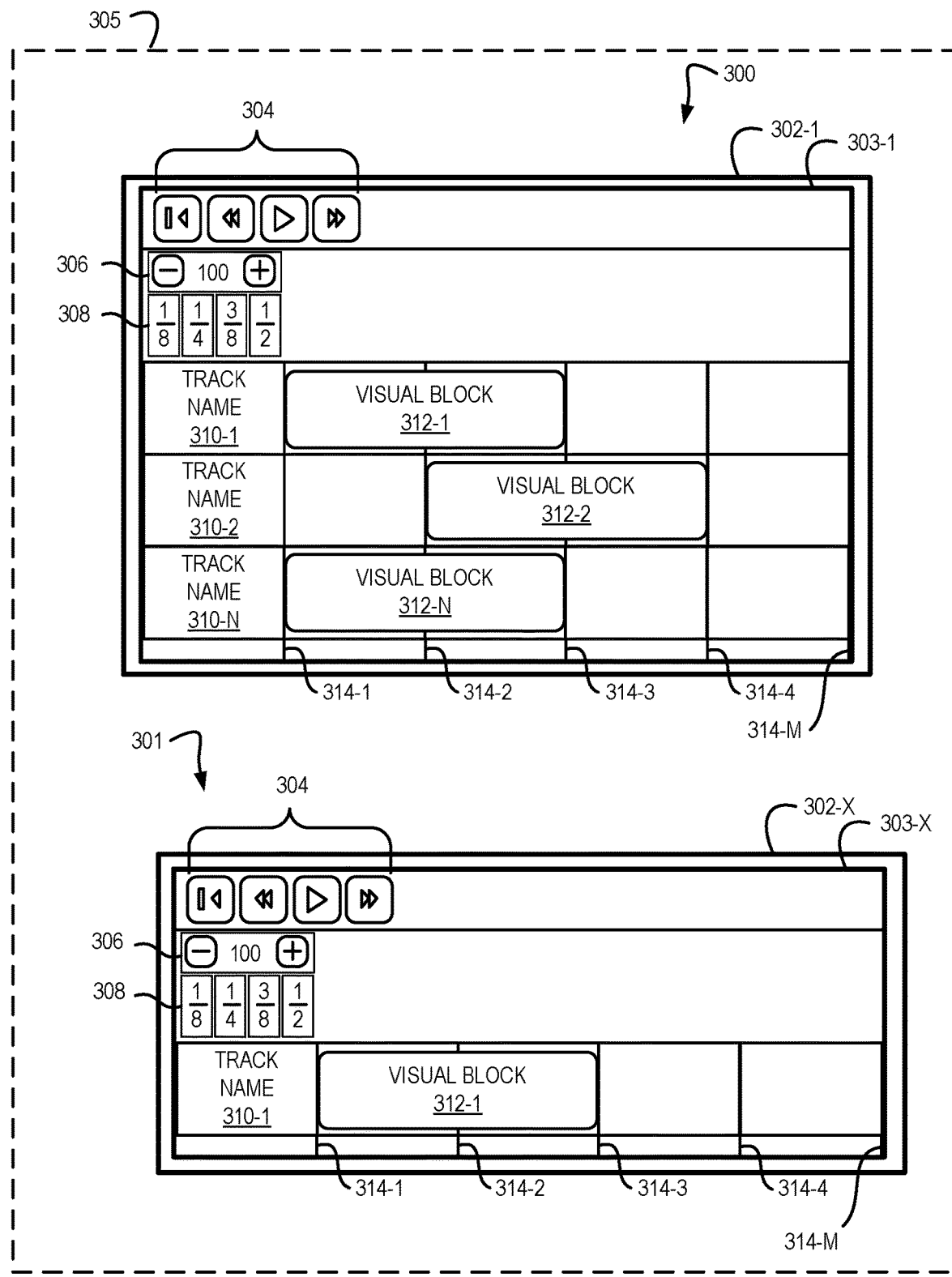
FIG. 3 is a diagram illustrating a system including a first graphical user interface (GUI) to display musical and graphic information and a second GUI to display musical and graphic information in accordance with a number of embodiments of the present disclosure.

In some embodiments, the visual block 112 can be generated within a plurality of bar lines (e.g., the bar lines 214-1 to 214-M illustrated in FIG. 2A and/or the bar lines 314-1 to 314-M illustrated in FIG. 3, herein). That is, in some embodiments, the visual block 112 can be generated in geometric order within an insulated border. However, embodiments are not so limited, and the visual block 112 can be generated such that only a portion of the visual block 112 falls between two or more consecutive bar lines (e.g., between the bar lines 214-2 and 214-3, between the bar lines 214-1 and 214-3, etc. illustrated in FIG. 2A) and/or the visual block 112 can be "dragged" or resized such that only a portion of the visual block 112 falls between two or more consecutive bar lines. As used herein, "bar lines" generally refer to vertical lines used to divide a musical staff into measures. In some non-limiting examples, the bar lines can be independent from a musical composition as a whole and therefore serve to divide musical information into measures or the bar lines can connect one or more musical staves throughout a musical composition (e.g., the bar lines can be systemic bar lines).

The visual block 112 can be resized, deleted, and/or moved in response to input received by the GUI 103. In some embodiments, a color of the visual block 112 can be selectively altered and/or text displayed within the visual block 112 can be added, deleted, and/or formatted, etc.

In some embodiments, the visual block 112 can include musical information 113. For example, the visual block 112 can be configured to display the musical information 113. The musical information 113 can be caused to be selectively displayed within the visual block 112, and hence, via the GUI 103, in response to commands received by the processing device 120.

The musical information 113 can include images, musical notes (e.g., standard musical notation and/or tablature), words (e.g., song lyrics, arrangement cues, memory aids, etc.), colors, or combinations thereof. In embodiments in which images are displayed as part of the musical information 113, the images can be generated and selectively displayed via user commands and can include chord diagrams, Musical Instrument Digital Interface (MIDI) information (e.g., MIDI trigger information corresponding to digital instruments, lights, videos, etc.), chord charts, audio tracks, etc. The images can be stored and/or displayed in various image formats, such as the Joint Photographic Experts Group (JPEG) format, Portable Networks Graphics (PNG) format, Graphics Interchange Format (GIF), among other image formats. In addition, in some embodiments, the musical information 113 can include video or motion picture information that can be displayed during live playback and/or recorded playback of the visual block(s) 112. Such video information can be stored and/or displayed in various formats, such as AVI, Advanced Systems Format (.asf), Flash Video (.flv), Windows Media Video (.wmv), or any other format that can store and/or display video information.

In some embodiments, the musical information 113 can be selectively configured to display information that is relevant to a particular user of the GUI 103. In a non-limiting example in which the user of the GUI 103 is a musician utilizing embodiments of the present disclosure to perform live music, the musician can selectively configure the information that is included within the musical information 113 to be displayed within the visual block 112 to include only information that the musician wishes to see displayed. This example is continued below in connection with FIG. 3.

FIG. 2A is another diagram illustrating an apparatus 200 including a display device 202 and graphical user interface (GUI) 203 to display musical and graphic information in accordance with a number of embodiments of the present disclosure. The display device 202 and the GUI 203 can be analogous to the display device 102 and the GUI 103 illustrated in FIG. 1, herein.

As shown in FIG. 2A, the GUI 203 can include a transport bar 204, a tempo control portion 206, a subdivision portion 208, and a zoom portion 211. The transport bar 204 can include icons that correspond to various functionalities that can be control via the GUI 203. For example, the transport bar 204 can include a "play" icon, a "fast forward" icon, a "rewind" icon, and/or a "stop" icon, among others. The icons associated with the transport bar 204 can be actuated (e.g., "clicked" using a pointing device) by a user to cause instructions executed by the computing device 200 to perform the action associated with the icon. Embodiments are not so limited, however, and in some embodiments, the icons associated with the transport bar 204 can be actuated in response to keyboard commands (or other commands input to a peripheral computing device), voice commands, and/or touchscreen commands, among others. In some embodiments, the GUI 203 can include icons that can allow tracks to be hidden and/or deleted.

The tempo control portion 206. For example, by actuating the "+" icon of the tempo control portion 206, the tempo at which the visual blocks 212-1 to 212-N scroll across the GUI 203 can be increased. Conversely, by actuating the "−" icon of the tempo control portion 206, the speed, which may be referred to herein in the alternative as appropriate given the context as the "tempo," at which the visual blocks 212-1 to 212-N scroll across the GUI 203 can be decreased. In some embodiments, the tempo control portion 206 can be set such that different musical bars can have different tempos associated therewith. The scrolling functionality of the GUI 203 and/or the visual blocks 212-1 to 212-N is described in more detail in connection with FIGS. 4A-4C, herein.

The icons associated with the subdivision portion 208 of the GUI 203 can be actuated by a user to control a quantity of subdivisions with a particular musical bar or block of musical information contained within the visual blocks 212-1 to 212-N. In some embodiments, the icons of the subdivision portion 208 can be actuated to control a quantity of notes or beats within a particular bar or set of bars of music. Stated alternatively, the icons of the subdivision portion 208 can be selectively actuated to control a resolution of an audible click track that can be reproduced by the computing system 100.

For example, if the "⅛" icon is selected on the subdivision portion 208 of the GUI 203, a click track (e.g., a series of audio and/or visual cues that can be used to synchronize sound recordings and/or be synchronized to one or more moving images, such as the visual blocks 212-1 to 212-N) that can be reproduced by the computing system during execution of the GUI 203 can play at a speed that corresponds to the reproduction of eighth notes. Similarly, if the "¼" icon is selected on the subdivision portion 208 of the GUI 203, a click track that can be reproduced by the computing system during execution of the GUI 203 can play at a speed that corresponds to the reproduction of quarter notes.

The zoom portion 211 can be actuated by a user to alter a display size of the track names 210-1 to 210-N and/or a display size of the visual blocks 212-1 to 212-N. For example, by moving or dragging the zoom control portion 211 in a first direction, a display size of the track names 210-1 to 210-N and/or the display size of the visual blocks 212-1 to 212-N can be increased thereby showing higher detail of the data contained within the track names 210-1 to 210-N and/or the visual blocks 212-1 to 212-N while showing fewer track names 210-1 to 210-N and/or visual blocks 212-1 to 212-N within the GUI 203. Conversely, by moving or dragging the zoom portion 206 in a second direction, the display size of the track names 210-1 to 210-N and/or the display size of the visual blocks 212-1 to 212-N can be decreased thereby showing lower detail of the data contained within the track names 210-1 to 210-N and/or the visual blocks 212-1 to 212-N while showing a greater quantity of track names 210-1 to 210-N and/or visual blocks 212-1 to 212-N within the GUI 203.

The track names 210-1 to 210-N can be configured to provide labels that correspond to respective visual blocks 212-1 to 212-N and/or musical information (e.g., the musical information 113 illustrated in FIG. 1, herein) contained in the respective visual blocks 212-1 to 212-N. In some embodiments, text or other information described within the track names 210-1 to 210-N can include identifying information for one or more parts of a musical composition that a user intends to perform.

For example, the track names 210-1 to 210-N can describe the musical information contained in each visual block 212-1 to 212-N for each track displayed by the GUI 203. The track names 210-1 to 210-N can be selectively named to provide additional functionality to the GUI 203 that can assist a user in manipulating the GUI 203. For example, one of the track names (e.g., the track name 210-1) can be named "GUITAR" to clarify that the visual block that corresponds to the track name (e.g., the visual block 212-1) displays musical information that is relevant to a user that is concerned with what a guitar player may be playing. Similarly, one of the track names (e.g., the track name 210-2) can be named "VOCALS" to clarify that the visual block that corresponds to the track name (e.g., the visual block 212-2) displays musical information that is relevant to a user that is concerned with what may be relevant to a vocalist during a musical performance.

In some embodiments, the GUI 203 can be provided to a person who is not part of the musical ensemble (e.g., to an audience member). In such embodiments, the visual blocks 212-1 to 212-N can contain visual information, such as text, images, video, graphics, etc. In embodiments in which the GUI 203 is provided to, for example, an audience member, the audience member can access the GUI 203 as a SaaS and the GUI 203 can be configured to display text (e.g., lyrics to a song being played by the musical ensemble), images and/or video to accompany the song being played by the musical ensemble, games (e.g., trivia, fun facts, etc.) to accompany the song being played by the musical ensemble, etc. In at least one embodiment in which the GUI 203 is accessed by an audience member, the GUI 203 may be configured to not be editable or alterable by the audience member.

The visual blocks 212-1 to 212-N can include musical information (e.g., the musical information 113 illustrated in FIG. 1, herein). The musical information contained in each of the visual blocks 212-1 to 212-N can be the same or different. For example, in some embodiments, the visual block 212-1 can include images, the visual block 212-2 can include musical notation, while the visual block 212-N can include words, video, graphics, images, and the like. It will, however, be appreciated that this enumerated example is merely illustrative and the visual blocks 212-1 to 212-N can contain any combination of musical information described herein and/or can be devoid of musical information.

In some embodiments, the GUI 203 can further include bar lines 214-1 to 214-M. As described above, the bar lines 214-1 to 214-M can correspond to a line that is used to divide a musical staff into measures. Further, as shown in FIG. 2A, the GUI 203 can include one or more markers 215 that can be used to mark specific locations within the GUI 203. The marker(s) 215 can be dragged or otherwise moved within the GUI 203 such that they can be positioned in particular locations within the GUI 203. In some embodiments, the marker(s) 215 can denote starting or ending positions within the GUI 203. Further, in some embodiments, the marker(s) 215 can be used to denote a portion of the musical arrangement that is displayed within the GUI 203 that can be "looped" (e.g., played repeatedly). In some embodiments, the portion of the musical arrangement can be "looped" in response to one or more commands.

The rate (e.g., the tempo) at which the GUI 203 displays or animates the visual blocks 212-1 to 212-N and/or the musical information contained within the visual blocks 212-1 to 212-N can be controlled automatically or via a user input.

Although the transport bar 204, the tempo control portion 206, subdivision portion 208, the zoom control portion 211, the track names 210-1 to 210-N, the visual blocks 212-1 to 212-N, and/or the bar lines 214-1 to 214-M are shown in particular locations and in a particular orientation within the GUI 203, it will be appreciated that embodiments are not limited to the specific layout and/or spatial arrangement illustrated in FIG. 2A. In contrast, FIG. 2A is provided to illustrate aspects of the present disclosure and provide the reader with a visual guide of an example of a GUI 203 in accordance with embodiments of the present disclosure. Accordingly, it will be appreciated that changes may be made to the location(s), arrangement(s), and/or orientation(s) of the transport bar 204, the tempo control portion 206, the subdivision portion 208, the zoom control portion 211, the track names 210-1 to 210-N, the visual blocks 212-1 to 212-N, and/or the bar lines 214-1 to 214-M without departing from the scope of the disclosure.

That is, although not explicitly shown in Figures, the GUI 203 can include different types of icons and/or icons that have different shapes than are shown in the Figures. For example, a speaker-shaped icon may be included in the GUI 203 to identify a type of selected track, an eyeball-shaped icon may be included in the GUI 203 to control hiding/showing of the selected track, an X-shaped icon may be included to the GUI 203 to simplify deletion of a selected track, an icon (e.g., a square-shaped icon with diagonal arrows contained therein) may be included in the GUI 203 to control toggling between full screen and minimized screen modes, and/or a person-shaped icon to control permissions associated with different users (e.g., what level of control each user is afforded with respect to modifying the musical information 113 and/or visual blocks 212), among others, may be included in the GUI 203. Further, various other functionalities may be included in the GUI 203, such as, but not limited to, volume controls, pan controls (e.g., control of which speakers are used to reproduce a particular track or instrument), audio/video input and/or output controls, etc. In addition, it will be appreciated that one or more of the transport bar 204, the tempo control portion 206, the subdivision portion 208, the zoom portion 211, the track names 210-1 to 210-N, the visual blocks 212-1 to 212-N, and/or the bar lines 214-1 to 214-M may be removed from the GUI 203 without departing from the scope of the present disclosure.

Figure 2B:
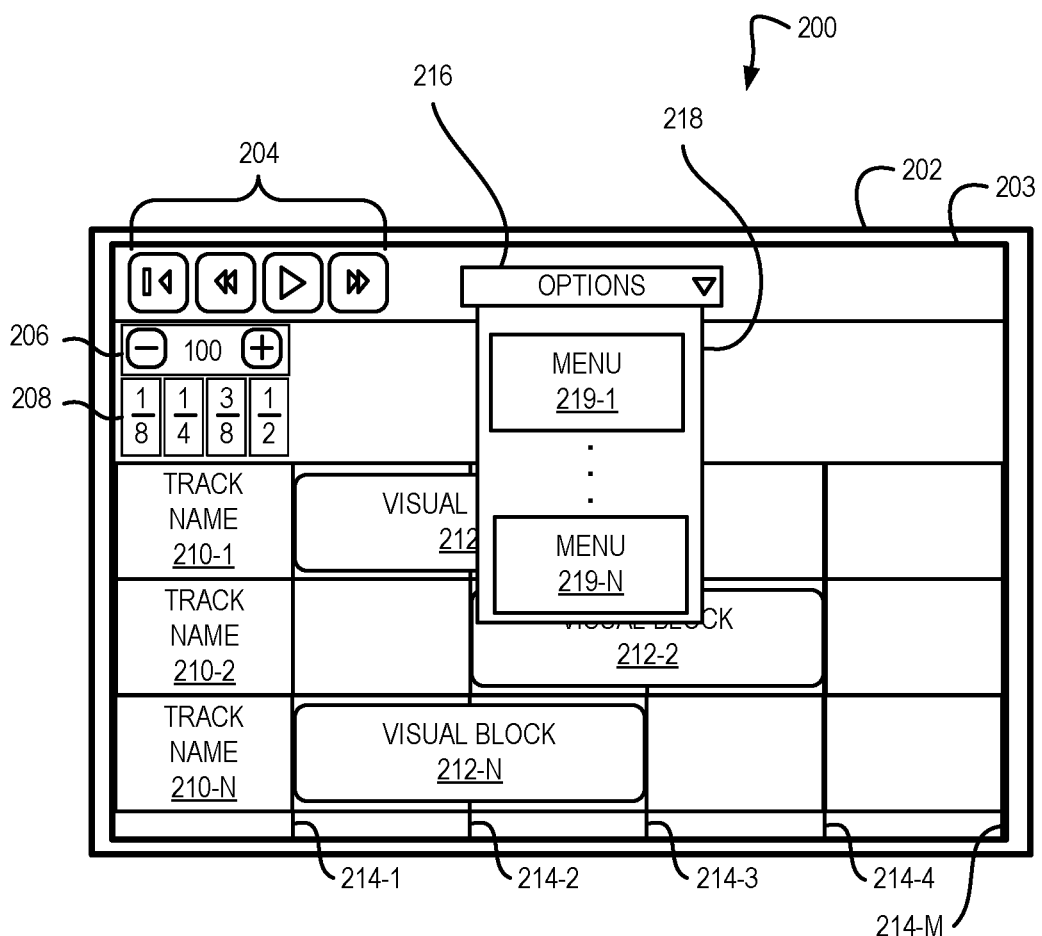
FIG. 2B is a diagram illustrating an apparatus including a display device, graphical user interface to display musical and graphic information, and menus in accordance with a number of embodiments of the present disclosure.

FIG. 2B is a diagram illustrating an apparatus including a display device 202, graphical user interface 203 to display musical and graphic information, and menus 219-1 to 219-N in accordance with a number of embodiments of the present disclosure. The GUI 203, the transport bar 204, the tempo control portion 206, the subdivision portion 208, and/or the zoom portion 211 can be analogous to the GUI 203, the transport bar 204, the tempo control portion 206, and/or the subdivision portion 208 illustrated in FIG. 2A.

In the example shown in FIG. 2B, the GUI 203 can be provided with an options portion 216, which, when active, can cause a drop-down box 218 displaying a plurality of menus 219-1 to 219-N to be displayed by the GUI 203. The menus 219-1 to 219-N can correspond to features and/or functionality that can be implemented within the GUI 203. For example, the menus 219-1 to 219-N can allow for arrangement tagging of track names 210-1 to 210-N and/or the visual blocks 212-1 to 212-N, tagging of users and/or song filters, smart transpose functionality, set building features, stage access functionality, section repeat functionality, tempo control based on sections of the arrangement, lyric generation, and/or, set list generation, among others. Furthermore, in some embodiments, the menus 219-1 to 219-N can display a data hierarchy that can allow a user to locate and/or organize different musical ensembles, shows, set lists, and/or arrangements, as shown in one or more Figures, herein.

Arrangement tagging can include providing identifying information to musical arrangements. In some embodiments, the arrangement tagging can be generated by a user and/or can be machine implemented via machine-based song recognition. Non-limiting examples of tags that can be used to identify musical arrangements can include simple identifiers such as "80s" (to refer to a specific time period), "female singers," "adult contemporary music," etc. In some embodiments, these tags can be filtered based on users of the GUI 203, set lists displayable by the GUI 203, etc.

The smart transpose functionality can allow for all the pitch and/or visual information displayed by the visual blocks 212-1 to 212-N to be adjusted up or down with a single parameter and/or command. This can allow for an entire composition to be shifted from one key to another, for example.

The set building feature can build or generate sets of musical arrangements. In some embodiments, the set building feature can use various musical composition parameters (e.g., arrangement tags, tempos, keys, set list time constraints, and/or other user defined parameters) to generate set lists that conform to specified criteria.

Stage access functionality refers to access to various musicians (and/or non-musicians, such as audience members) to the GUI 203. For example, a first user may generate one or more songs, set lists, show lists, and/or ensembles, and portions of each of these may be selectively accessible to other users. In a simplified, non-limiting example, a band leader may create an arrangement that includes each part of a song (e.g., a vocal part, a guitar part, a bass part, a drum part, etc.). In order to share the arrangement with other users, the stage access functionality may be invoked to allow only those users that are privy to the arrangement to have the arrangement displayed on their respective GUI 203. In some embodiments, the stage access functionality can be provided to the other users as a QR code, a one-time password, a cryptographic key, or by any other secure method. In some embodiments, different secure keys, codes, etc. can be provided to the users that allow access only to a particular subset of the overall arrangement. Embodiments are not so limited, however, and in some embodiments, various functionalities described herein can be provided or shared using unsecured methods of communication.

The generation of lyrics, set lists, etc. can be invoked to output information that is stored in conjunction with operation of the GUI 203. For example, a user may desire to output (e.g., print) a set list that was generated in connection with the set builder feature. In some embodiments, the menus 219-1 to 219-N can include an option to export such information in order for the user to view the information and/or print the information for use outside of the GUI 203.

FIG. 3 is a diagram illustrating a system 305 including a first graphical user interface (GUI) 303-1 to display musical and graphic information and a second GUI 303-X to display musical and graphic information in accordance with a number of embodiments of the present disclosure. The GUI 303-1 and the GUI 303-X can be analogous to the GUI 103 illustrated in FIG. 1 or the GUI 203 illustrated in FIGS. 2A and 2B, herein. The GUIs 303-1 to 303-X can be generated by respective computing devices 300 and 301, which can be analogous to the computing devices 100 discussed in connection with FIG. 1, herein.

As shown in FIG. 3, a first GUI 303-1 can display a different quantity of visual blocks 312-1 to 312-N than the GUI 303-X. In some embodiments, the different quantity of visual blocks 312 displayed by the first GUI 303-1 and the second GUI 303-X can reflect different parts of a musical composition that are being played by different musicians in an ensemble. For example, the first GUI 303-1 can be used by a musician that requires more parts of a musical composition to be visible, while the second GUI 303-X can be used by a musician who requires fewer parts of the musical composition to be visible. It is noted that, in some embodiments, the first GUI 303-1 and the second GUI 303-X can be synchronized to one another with respect to at least of a time, a tempo, a bar, or other global parameter associated with a composition or arrangement being displayed by the first GUI 303-1 and/or the second GUI 303-X.

Continuing with the example of FIG. 1 in which the musician can selectively configure the information that is included within the musical information (e.g., the musical information 113 illustrated in FIG. 1) to be displayed within the visual block(s) 312-1 to 312-N to include only information that the musician wishes to see displayed, if the musician is playing lead guitar for a particular musical composition (e.g., a song), the musician may not care what parts of the particular composition other musicians in a musical ensemble are playing. In this example, the lead guitar player can selectively configure the musical information 113 such that the parts of the particular composition that are being performed by the other musicians are not visible to the lead guitar player.

In another non-limiting example in which the user of the GUI 103 is a musician utilizing embodiments of the present disclosure to perform live music, the musician may be a percussionist and may therefore care about certain parts of the particular composition other musicians in a musical ensemble are playing. In this example, the percussionist can selectively configure the musical information 113 such certain parts of the particular composition that are being performed by the other musicians are visible to the percussionist. For example, the percussionist may want to see information that includes the notes a bass guitar player or flautist are playing.

In yet another non-limiting example in which the user of the GUI 103 is a musician utilizing embodiments of the present disclosure to perform live music, the musician may be a conductor or band leader of the ensemble and may therefore care about all parts of the particular composition other musicians in a musical ensemble are playing. In this example, the conductor or band leader can selectively configure the GUI 103 such all parts (e.g., all tracks) of the particular composition that are being performed by the other musicians are visible to the conductor or band leader.

In a further non-limiting example in which the user of the GUI 103 is a musician utilizing embodiments of the present disclosure to perform live music, the musician may care about certain parts of the particular composition at different times and/or may care about certain parts of only certain compositions that may be performed during a live musical performance.

In yet another non-limiting example, a first computing device 300 can include a first display component 302-1 and a second computing device 301 can include a second display component 302-X. The first computing device 300 can be configured to receive a command to generate a plurality of configurable visual blocks 312-1 to 312-N each comprising a quantity of musical information (e.g., the musical information 113 illustrated in FIG. 1, herein) that is displayable in a first physical dimension and a second physical dimension with respect to the first display component 302-1 and selectively display a portion of the plurality of configurable visual blocks 312-1 to 312-N on the first display component 302-1.

Continuing with this example, in some embodiments the second computing device 302-X can be configured to receive a combination of information from the first computing device 301 and a user input to selectively display a subset of the portion of the plurality of configurable visual blocks 312-1 on the second display component 302-X, wherein the portion of the plurality of configurable visual blocks 312-1 selectively displayed on the second display component have a first physical dimension and a second physical dimension with respect to the second display component 302-X. In some embodiments, the first physical dimension and the second physical dimension with respect to the first display component 302-1, the first physical dimension and the second physical dimension with respect to the second display component 302-X, or both can correspond to a tempo (e.g., a beats-per-minute parameter), a time signature, musical information, or combinations thereof. Stated alternatively, in some embodiments, particular bar lines 314-1 to 314-M of the first GUI 303-1 can, while the first GUI 303-1 and the second GUI 303-X are operating in a play mode, can line up with corresponding bar lines 314-1 to 314-M of the second GUI 303-X. For example, if the first GUI 303-1 is at the bar line 314-2, the second GUI 303-X may also be at the bar line 314-2.

Embodiments are not so limited, however, and in some embodiments, the second computing device 302-X can be configured to directly receive a user input to selectively display a subset of the portion of the plurality of configurable visual blocks 312-1 on the second display component 302-X. In some embodiments, whether the second computing device 302-X can receive input directly from a user (and to that extent that input can be used to manipulate the subset of the portion of visual blocks 312-1) can be based on permissions associated with the second computing device 302-X. That is, an amount of control allowed to a user of the second computing device 302-X can be based on permissions granted to the user of the second computing device 302-X by the first computing device 302-1.

In some embodiments, the first computing device 300, the second computing device 301, or both, can be configurable to control a tempo associated with display of the plurality of configurable visual blocks 312-1 to 312-N, the subset of the plurality of configurable visual blocks 312-1, or the subset of the portion of the plurality of configurable visual blocks, or any combination thereof on the first display component 302-1, the second display component 302-X, or both.

Further, as described above in connection with FIG. 1, the musical information can include at least one of a time signature, a tempo, a musical tablature, a musical notation, an audio file, a lyric, an image file, and/or a Musical Instrument Digital Interface (MIDI) file, among other file types currently known or yet to be discovered, or any combination thereof.

Figure 4A:
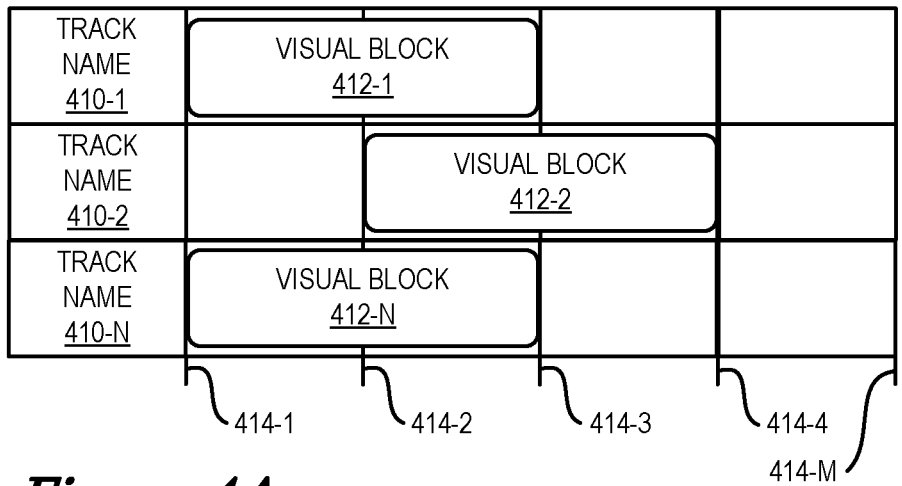
FIGS. 4A-4C are diagrams illustrating visual blocks of a graphical user interface to display musical and graphic information over time.
Figure 4B:
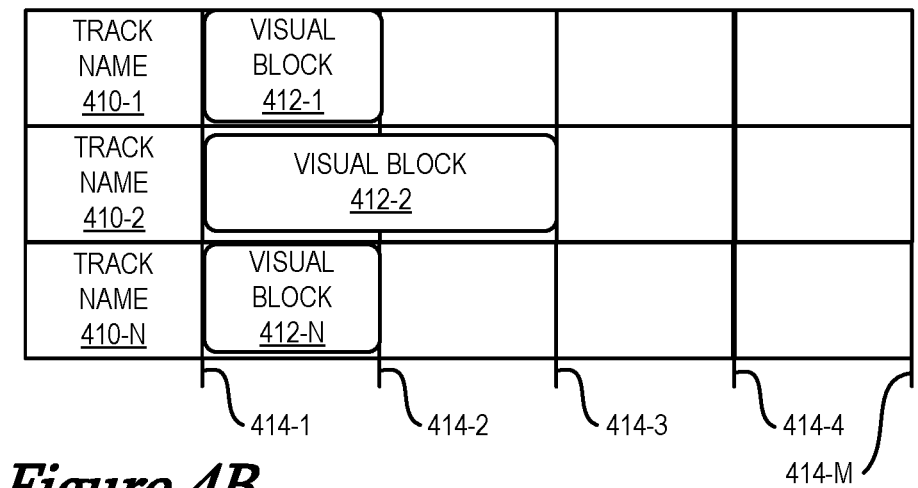
Figure 4C:
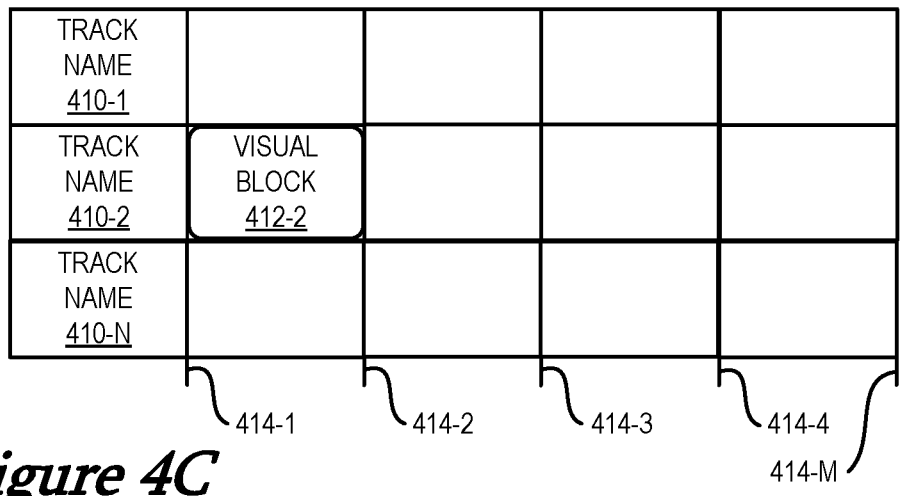

In some embodiments, the first computing device 300, the second computing device 301, or both can be configured to cause the plurality of configurable visual blocks 312-1 to 312-N and the subset of the portion of the plurality of visual blocks 312-1 to be displayed on the first display component 302-1, the second display component 302-X, or both to move across the first display component 302-1, the second display component 302-X, or both in a scrolling fashion, as described below in connection with FIGS. 4A-4C.

In some embodiments, the first computing device 300 and/or the second computing device 301 can be configured to generate a file including the quantity of musical information and export the generated file according to a format determined based, at least in part, on a set of user generated parameters received by the first computing device, the second computing device, or both.

FIGS. 4A-4C are diagrams illustrating visual blocks 412-1 to 412-N of a graphical user interface (e.g., the GUI 203 illustrated in FIG. 2A, herein) to display musical and graphic information over time. Accordingly, an axis parallel to the horizontal with respect to FIGS. 4A-4C represents time (e.g., points that fall farther to the right with the respect to FIGS. 4A-4C represent a later point in time than those that fall to the left). For example, FIG. 4A illustrates the visual blocks 412-1 to 412-N at a first time, FIG. 4B illustrates the visual blocks 412-1 to 412-N at a second time, and FIG. 4C illustrates the visual blocks 412-1 to 412-N at a third time. Accordingly, FIGS. 4A-4C collectively represent the movement of the visual blocks 412-1 to 412-N while the GUI is in a "play" mode (e.g., when the play icon of the transport bar 204 illustrated in FIGS. 2A and 2B is activated).

As shown in FIGS. 4A-4C, during operation of the GUI, the visual blocks 412-1 to 412-N can "scroll" toward the left side of the GUI. This can allow for a scrolling or streaming representation of musical information (e.g., the musical information 113 illustrated in FIG. 1, herein) contained within the visual blocks 412-1 to 412-N. The rate at which the visual blocks 412-1 to 412-N scroll (horizontally and/or vertically with respect to the GUI illustrated in the Figures) can be dictated by the tempo and/or the level of zoom selected for the GUI. As used herein, a "level of zoom" generally refers to a level of magnification applied to one or more of the visual blocks 412-1 to 412-N. For example, the zoom level can be increased to show more detail of the musical information (e.g., the musical information 113 illustrated in FIG. 1, herein) or decreased to show less detail of the musical information contained within the visual blocks 412-1 to 412-N. As will be appreciated, as the zoom is increased, fewer visual blocks 412-1 to 412-N may be displayed in the GUI and, conversely, as the zoom is decreased, a greater quantity of visual blocks 412-1 to 412-N may be displayed in the GUI.

Figure 5:
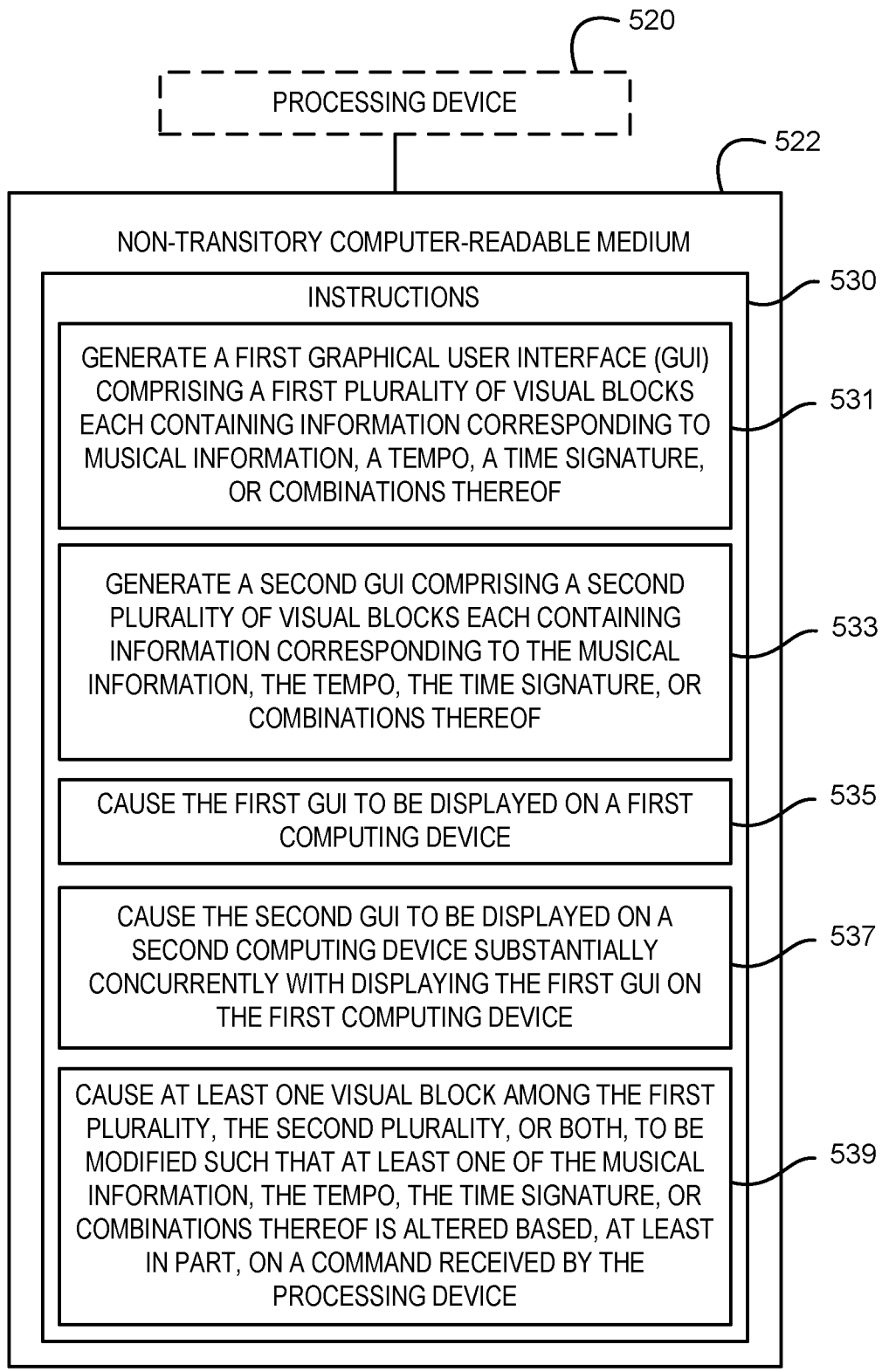
FIG. 5 illustrates an example non-transitory computer-readable medium comprising executable instructions for performing generation and selective synchronized display of musical and graphic information on one or more devices capable of displaying musical and graphic information in accordance with a number of embodiments of the present disclosure.

FIG. 5 illustrates an example non-transitory computer-readable medium 522 comprising executable instructions for performing generation and selective synchronized display of musical and graphic information on one or more devices capable of displaying musical and graphic information in accordance with a number of embodiments of the present disclosure. The non-transitory computer-readable medium 522 can be hosted and/or executed in a "cloud" (e.g., in a software-defined data center) and therefore can, upon execution of the instructions 530 cause a computing device, such as the computing devices 300, 301 illustrated in FIG. 3, cause the computing device(s) to perform the operations described herein in the absence of downloading the instructions 530 to the computing device (e.g., the non-transitory computer-readable instructions 530 can be executed as a software as a service (SaaS). Embodiments are not so limited, however, an in some embodiments, the instructions 530 or a portion thereof can be downloaded to the computing device and executed thereon.

At block 531, the instructions 530 can be executed to generate a first graphical user interface (GUI) comprising a first plurality of visual blocks each containing information corresponding to musical information, a tempo (e.g., a beats-per-minute parameter), a time signature, or combinations thereof.

At block 533, the instructions 530 can be executed to generate a second GUI comprising a second plurality of visual blocks each containing information corresponding to the musical information, the tempo, the time signature, or combinations thereof.

In some embodiments, the first plurality of visual blocks or the second plurality of visual blocks contains at least one visual block that contains musical information that is different than at least one visual block that is not contained in the other of the first plurality of visual blocks or the second plurality of visual blocks.

At block 535, the instructions 530 can be executed to cause the first GUI to be displayed on a first computing device. The first GUI can be analogous to the GUI 303-1 illustrated in FIG. 3, while the first computing device can be analogous to the computing device 300 illustrated in FIG. 3.

At block 537, the instructions 530 can be executed to cause the second GUI to be displayed on a second computing device substantially concurrently with displaying the first GUI on the first computing device. The second GUI can be analogous to the GUI 303-X illustrated in FIG. 3, while the second computing device can be analogous to the computing device 301 illustrated in FIG. 3.

At block 539, the instructions 530 can be executed to cause at least one visual block among the first plurality, the second plurality, or both, to be modified such that at least one of the musical information, the tempo, time signature, or combinations thereof is altered based, at least in part, on a command received by the processing device.

In some embodiments, the instructions 530 can be executed to cause the first GUI, the second GUI, or both to display musical information comprising at least one of a musical tablature, a musical notation, an audio track, a lyric, an image, an image file, a Musical Instrument Digital Interface (MIDI) file, or any combination thereof. In some embodiments, the instructions 530 can be executed to control various stage enhancements, such as lighting, video, MIDI instruments, and/or outboard devices (e.g., outboard synthesizers), among others. In addition, the instructions 530 can, in some embodiments, be executed to provide a sound feed from the musicians to a sound engineer (e.g., a sound board feed).

In some embodiments, the instructions 530 can be executed to generate a file including at least one of the musical information, the tempo, the time signature, or combinations thereof and/or export the generated file according to a format determined based, at least in part, on a set of user generated parameters received by the processing device.

In some embodiments, the generated file can be an audio and/or video recording of a musical performance or a portion thereof. In some embodiments, concert goers may access or download an application that can allow a portion of the instructions 530 to be executed to provide a concert goer experience on a concert goer's computing device. In such embodiments, the instructions 530 can be executed to display song lyrics, images, light shows, videos, and/or music trivia or other games, among other displayed information, to encourage audience participation during a musical performance.

In addition, in some embodiments, a concert goer may be able to access some of the functionalities described herein to further engage with a musical performance. For example, in some embodiments, a concert goer may be provided with their own GUI that can allow them to upload images and/or videos to be used in the musical performance and/or a concert goer may be provided with their own GUI that can allow them to interact with lighting displays to request or manipulate light displays, colors of light displays, etc.

In some embodiments, the instructions 530 can be executed to provide a specific GUI to a sound engineer (e.g., a live sound engineer) at a concert venue. In this embodiment, the sound engineer may be granted special access permissions to facilitate audio and/or video mixing during a musical performance. For example, the sound engineer may be granted particular access permissions that can interface with mixing equipment used by the sound engineer to improve the overall sound or video mixing provided in connection with the musical performance.

Figure 6:
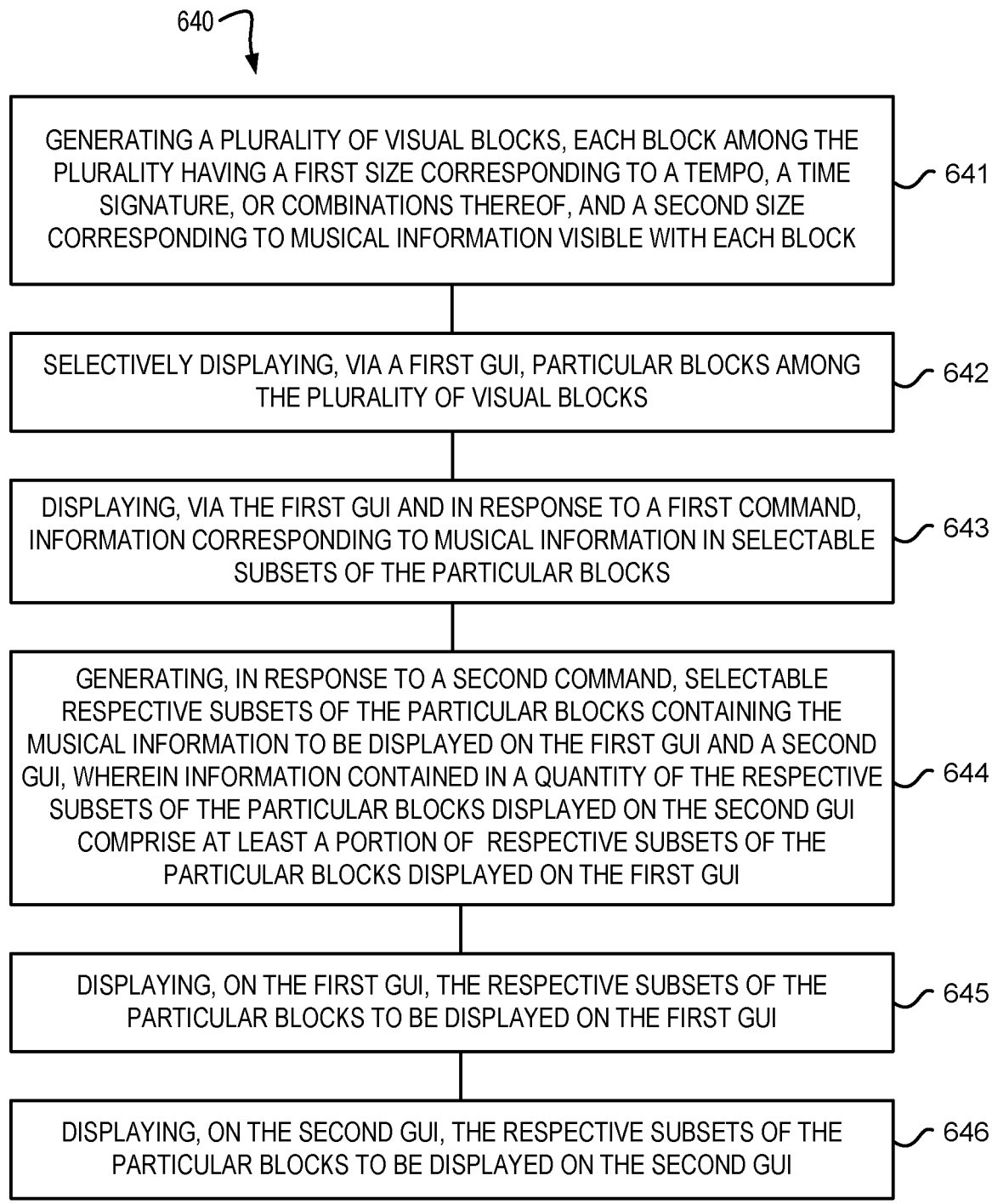
FIG. 6 is a flow diagram representing an example method for generation and selective synchronized display of musical and graphic information on one or more devices capable of displaying musical information and graphic in accordance with a number of embodiments of the present disclosure.

FIG. 6 is a flow diagram representing an example method 640 for generation and selective synchronized display of musical information on one or more devices capable of displaying musical and graphic information in accordance with a number of embodiments of the present disclosure. The method 640 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 641, the method 640 can include generating a plurality of visual blocks, each block among the plurality having a first dimension corresponding to a tempo (e.g., a beats-per-minute parameter), a zoom level, a time signature, etc., or combinations thereof, and a second dimension corresponding to musical information visible with each block. The plurality of visual block can be analogous to the visual blocks 212-1 to 212-N illustrated in FIG. 2A, herein. In some embodiments, the first physical dimension and the second physical dimension can correspond to visual display elements when displayed on a user device displaying the first GUI, a user device displaying the second GUI, or both.

At block 642, the method 640 can include selectively displaying, via a first graphical user interface (GUI), particular blocks among the plurality of visual blocks. The first GUI can be analogous to the GUI 303-1 illustrated in FIG. 3, herein. In some embodiments, the method 640 can include comprising inputting, by a user, information corresponding to the plurality of visual blocks via a peripheral device, a touch screen, or both, associated with a display of at least the first GUI.

At block 643, the method 640 can include displaying, via the first GUI and in response to a first command, information corresponding to musical information in selectable subsets of the particular blocks. The musical information can be analogous to the musical information 113 illustrated in FIG. 1, herein. For example, the musical information can include musical tablature, musical notation, audio tracks, lyrics, image files, Musical Instrument Digital Interface (MIDI) files, or any combination thereof. In some embodiments, the musical information can be uploadable, customizable, writeable, exportable, syncable, or any combination thereof.

At block 644, the method 640 can include generating, in response to a second command, selectable respective subsets of the particular blocks containing the musical information to be displayed on the first GUI and a second GUI, wherein information contained in a quantity of the respective subsets of the particular blocks displayed on the second GUI comprise at least a portion of respective subsets of the particular blocks displayed on the first GUI. The second GUI can be analogous to the GUI 303-X illustrated in FIG. 3, herein. Further, in some embodiments, respective subsets of the particular blocks can include at least one visual block that contains musical information that is different than at least one visual block that is not contained in the portion of respective subsets of the particular blocks. In some embodiments, the tempo, the time signature, the musical information, or combinations thereof can be modifiable in response to receipt of a third command.

At block 645, the method 640 can include displaying, on the first GUI, the respective subsets of the particular blocks to be displayed on the first GUI. The method 640 can, at block 646 include displaying, on the second GUI, the respective subsets of the particular blocks to be displayed on the second GUI.

In some embodiments, the method 640 can include displaying the respective subsets of the particular blocks to be displayed on the first GUI and the respective subsets of the particular blocks to be displayed on the second GUI substantially concurrently. Further, in some embodiments, at least one of the first GUI, the second GUI, or both can be configured to present their respective subsets of visual blocks in a scrolling fashion, as described in connection with FIGS. 4A-4C, herein.

As described above, in some embodiments, the method 640 can include generating an output file containing at least one of the plurality of visual blocks. As described above, the output file can include images, text, or other information that can correspond to the visual blocks. Further, the output file can be generated in a format that is suitable for printing.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   generating a plurality of visual blocks, each block among the plurality having a first dimension corresponding to a tempo, a time signature, or combinations thereof, and a second dimension corresponding to musical information visible with each block, wherein sets of visual blocks among the plurality of visual blocks include musical information corresponding to respective instruments, and wherein the sets of visual blocks are organized in rows that correspond to particular respective instruments;
   selectively displaying, via a first GUI, a first plurality of the sets of visual blocks in response to a first command generated by a user of the first GUI, wherein the first plurality of the sets of visual blocks are displayed in a first quantity of respective rows that correspond to the particular instruments;

generating, in response to a first command generated by a user of a second GUI, a second plurality of the sets of visual blocks to be displayed on the second GUI, wherein the second plurality of the sets of visual blocks are displayed in a second quantity of respective rows that correspond to the particular instruments, and wherein the second quantity of respective rows that correspond to the particular instruments is different than the first quantity of respective rows that correspond to the particular instruments;

displaying, on the second GUI, the second plurality of the sets of visual blocks in response to the first command generated by the user of the second GUI;

modifying, in response to a second command generated by the user of the first GUI, musical information displayed within the first plurality of sets of blocks, or the first quantity of respective rows that correspond to the particular musical instruments, or both displayed on the first GUI; and modifying, in response to a second command generated by the user of the second GUI, musical information displayed within the first plurality of sets of blocks, or the first quantity of respective rows that correspond to the particular musical instruments, or both displayed on the second GUI.

2. The method of claim 1, further comprising displaying the first plurality of the sets of visual blocks on the first GUI and the second plurality of the sets of visual blocks on the second GUI substantially concurrently.

3. The method of claim 1, wherein the musical information is uploadable, customizable, writeable, exportable, syncable, or any combination thereof.

4. The method of claim 1, wherein the first physical dimension and the second physical dimension correspond to visual display elements when displayed on a user device displaying the first GUI, a user device displaying the second GUI, or both.

5. The method of claim 1, further comprising inputting, by a user, information corresponding to the plurality of visual blocks via a peripheral device, a touch screen, or both, associated with a display of at least the first GUI.

6. The method of claim 1, wherein at least one of the first GUI, the second GUI, or both is configured to present their respective plurality of the sets of visual blocks in a synchronized scrolling fashion.

7. The method of claim 1, wherein the musical information comprises musical tablature, musical notation, audio tracks, lyrics, image files, Musical Instrument Digital Interface (MIDI) files, or any combination thereof.

8. The method of claim 1, further comprising generating an output file containing at least one of the plurality of visual blocks.

9. The method of claim 1, wherein the tempo, the time signature, the musical information, or combinations thereof are modifiable in response to receipt of a third command from the user of the first GUI or from the user of the second GUI.

10. The method of claim 1, wherein the first plurality of sets of visual blocks comprises at least one visual block that contains musical information that is different than at least one visual block among the second plurality of visual blocks.

11. A non-transitory machine-readable medium storing instructions executable by a processing device to cause the processing device to:

generate a first graphical user interface (GUI) comprising a first plurality of visual blocks organized in respective rows, wherein each respective row contains first sets of visual blocks that correspond to particular instruments, and wherein each visual block among the first plurality of visual blocks contains information corresponding to musical information, a tempo, a time signature, or combinations thereof;

generate a second GUI comprising a second plurality of visual blocks organized in respective rows, wherein each respective row contains second sets of visual blocks that correspond to the particular instruments, and wherein each visual block among the second plurality of visual blocks contains information corresponding to the musical information, the tempo, the time signature, or combinations thereof;

cause the first GUI to be displayed on a first computing device;

cause the second GUI to be displayed on a second computing device substantially concurrently with displaying the first GUI on the first computing device; and cause, in response to a command generated by a user of the second computing device, at least one set of the second set of visual blocks to be deleted such that the second GUI displays at least one fewer respective row that corresponds to the particular instruments than the first GUI.

12. The medium of claim 11, wherein the instructions are further executable by the processing device to cause the first GUI, the second GUI, or both to display musical information comprising at least one of a musical tablature, a musical notation, an audio track, a lyric, an image, an image file, a Musical Instrument Digital Interface (MIDI) file, or any combination thereof.

13. The medium of claim 11, wherein the instructions are further executable by the processing device to:

generate a file including at least one of the musical information, the tempo, the time signature, or combinations thereof; and export the generated file according to a format determined based, at least in part, on a set of user generated parameters received by the processing device.

14. The medium of claim 11, wherein the first plurality of visual blocks or the second plurality of visual blocks contains at least one visual block that contains musical information that is different than at least one visual block that is not contained in the other of the first plurality of visual blocks or the second plurality of visual blocks.

15. A system, comprising:

a first computing device including a first display component;

a second computing device including a second display component, the second computing device communicatively coupled to the first computing device, wherein:

the first computing device is configured to:

receive a command from a user of the first computing device to generate a first plurality of sets of configurable visual blocks, wherein each visual block comprises a quantity of musical information that is displayable in a first physical dimension and a second physical dimension with respect to the first display component, and wherein each of the sets of configurable visual blocks correspond to particular instruments; and display the sets of configurable visual blocks on the first display component in response to command from the user of the first computing device, and wherein;

the second computing device is configured to:
receive a command from a user of the second computing device to generate a second plurality of sets of configurable visual blocks, wherein each visual block comprises a quantity of musical information that is displayable in a first physical dimension and a second physical dimension with respect to the second display component, and wherein each of the sets of configurable visual blocks correspond to the particular instruments;
display the second plurality of sets of configurable visual blocks on the second display component such that at least one fewer set of visual blocks is displayed on the second computing device than is displayed on the first computing device in response to the command from the user of the second computing device.

16. The system of claim 15, wherein the second computing device is configured to display the second sets of configurable visual blocks on the second display component such that visual blocks corresponding to at least one of the particular instruments that are displayed on the first computing device are not displayed on the second computing device in response to the command from the user of the second computing device.

17. The system of claim 15, wherein the first physical dimension and the second physical dimension with respect to the first display component, the first physical dimension and the second physical dimension with respect to the second display component, or both correspond to a tempo, a time signature, musical information, or combinations thereof.

18. The system of claim 15, wherein the first computing device, the second computing device, or both are configured to cause the plurality of configurable visual blocks and the subset of the portion of the plurality of visual blocks to be displayed on the first display component, the second display component, or both to move across the first display component, the second display component, or both in a synchronized scrolling fashion.

19. The system of claim 15, wherein the first computing device, the second computing device, or both are configurable to:
generate a file including the quantity of musical information; and
export the generated file according to a format determined based, at least in part, on a set of user generated parameters received by the first computing device, the second computing device, or both.

20. The system of claim 15, wherein the first computing device, the second computing device, or both are configurable to control a tempo associated with display of the plurality of configurable visual blocks, the subset of the plurality of configurable visual blocks, or the subset of the portion of the plurality of configurable visual blocks, or any combination thereof on the first display component, the second display component, or both.

* * * * *